(12) United States Patent
Guo et al.

(10) Patent No.: US 12,195,571 B2
(45) Date of Patent: Jan. 14, 2025

(54) UNSATURATED POLYESTER RESIN, AND PREPARATION METHOD THEREFOR AND USE THEREOF

(71) Applicant: GUANGDONG HINNO-TECH CO., LTD., Jiangmen (CN)

(72) Inventors: Yongjun Guo, Jiangmen (CN); Jianxiong Chen, Jiangmen (CN); Xinquan Zhang, Jiangmen (CN); Zhaoyi Zhou, Jiangmen (CN)

(73) Assignee: GUANGDONG HINNO-TECH CO., LTD., Jiangmen (CN)

( * ) Notice: Subject to any disclaimer, the term of this patent is extended or adjusted under 35 U.S.C. 154(b) by 451 days.

(21) Appl. No.: 17/626,767

(22) PCT Filed: Apr. 30, 2020

(86) PCT No.: PCT/CN2020/088418
§ 371 (c)(1),
(2) Date: Jan. 12, 2022

(87) PCT Pub. No.: WO2021/114553
PCT Pub. Date: Jun. 17, 2021

(65) Prior Publication Data
US 2022/0289967 A1    Sep. 15, 2022

(30) Foreign Application Priority Data
Dec. 9, 2019    (CN) .......................... 201911250952.8

(51) Int. Cl.
| | |
|---|---|
| C08F 283/01 | (2006.01) |
| C08F 4/32 | (2006.01) |
| C08F 212/08 | (2006.01) |
| C08F 220/14 | (2006.01) |
| C08G 63/183 | (2006.01) |
| C08G 63/42 | (2006.01) |
| C08L 63/00 | (2006.01) |
| C08L 67/03 | (2006.01) |

(52) U.S. Cl.
CPC .............. *C08F 283/01* (2013.01); *C08F 4/32* (2013.01); *C08F 212/08* (2013.01); *C08F 220/14* (2013.01); *C08G 63/183* (2013.01); *C08G 63/42* (2013.01); *C08L 63/00* (2013.01); *C08L 67/03* (2013.01)

(58) Field of Classification Search
CPC ................................ C08F 283/01; C08L 67/06
See application file for complete search history.

(56) References Cited

U.S. PATENT DOCUMENTS

| | | |
|---|---|---|
| 3,644,612 A | 2/1972 | Meyer et al. |
| 6,894,112 B1 | 5/2005 | Weber et al. |
| 11,708,444 B2 | 7/2023 | Powell et al. |
| 2012/0282475 A1* | 11/2012 | Fuhry ................... C08F 283/01 524/502 |
| 2013/0261243 A1* | 10/2013 | Nagaoka ................. C08L 67/08 524/399 |
| 2019/0055411 A1* | 2/2019 | Umino ................... C09D 5/002 |

FOREIGN PATENT DOCUMENTS

| | | |
|---|---|---|
| CN | 101121815 A | 2/2008 |
| CN | 102719180 A | 10/2012 |
| CN | 103740184 A | 4/2014 |
| CN | 106046731 A | 10/2016 |
| CN | 107163478 A | 9/2017 |
| CN | 108503757 A | 9/2018 |
| CN | 108948335 A | 12/2018 |
| CN | 109054597 A | 12/2018 |
| CN | 109354849 A * | 2/2019 |
| CN | 110256635 A | 9/2019 |
| CN | 110373109 A | 10/2019 |
| JP | S4978787 A | 7/1974 |
| JP | 06-271631 A * | 9/1994 |
| JP | 09-110949 A * | 4/1997 |
| KR | 1020140070117 A | 6/2014 |
| KR | 1020170087583 A | 7/2017 |
| KR | 1020190094414 A | 8/2019 |
| TW | I285671 B | 8/2007 |
| TW | 200948909 A | 12/2009 |
| WO | 9842766 A1 | 10/1998 |

OTHER PUBLICATIONS

Machine translation of CN 109354849 (no date).*
Machine translation of JP 09-110949 (no date).*
Machine translation of JP 06-271631 (no date).*
Machine translation of JP 01-043539 (no date).*
International Search Report and Written Opinion, and English Translation thereof, for International Application No. PCT/CN2020/088148, mailed Sep. 16, 2020 (13 pages).
Chinese Office Action for counterpart Chinese Application No. 201911250952.8, mailed Aug. 27, 2020 (7 pages).

(Continued)

*Primary Examiner* — Marc S Zimmer
(74) *Attorney, Agent, or Firm* — Kagan Binder, PLLC

(57) ABSTRACT

The present invention relates to an unsaturated polyester resin, and a preparation method therefor and use thereof. The unsaturated polyester resin is prepared of the following raw materials in parts by mass: 50-90 parts of a prepolymer, 10-30 parts of phenylethylene, 5-15 parts of methyl methacrylate, and 5-15 parts of 1,3,5-triglycidyl isocyanurate. The prepolymer is formed by combining polyol, a benzene-containing polybasic acid, and an unsaturated polybasic acid with a molar ratio of (2.2-4.5):(1-1.5):(1-1.5); and in the prepolymer, the molar ratio of hydroxyl to carboxyl is (1.0-1.5):1. The unsaturated polyester resin has good yellowing resistance and also has good heat resistance, and a thermal deformation temperature is generally higher than 130° C.

16 Claims, No Drawings

(56) References Cited

OTHER PUBLICATIONS

Taiwan Office Action for counterpart Taiwan Application No. 109119873, mailed Apr. 30, 2021 (4 pages).
Chief Editor: Wang, Dezhong, "12.8.3.1 Features and Applications," Production and Applications of Epoxy Resin, 2nd Edition, pp. 580-585, Jun. 30, 2001, (8 pages). (Machine English Translation of Abstract only. See International Search Report for PCT/CN2020/088418).
Chief Editor: Shanghai Yan GPU Chemical Factory, "1 Synthesis of Alicyclic Epoxy Resin," Production and Application on Peracetic Acid, 1st Edition, pp. 123-128, Sep. 30, 1975, (8 pages). (Machine English Translation of Abstract only. See International Search Report for PCT/CN2020/088418).
The Japan Society of Polymer Science, Editing, "12.3 Laminating Process," Principles and Practical Techniques of Plastics Processing, 1st Edition, p. 418, Oct. 31, 1991, (3 pages). (Machine English Translation of Abstract only. See International Search Report for PCT/CN2020/088418).
Li et al., "6. triglycidyl isocyanurate," Adhesive Raw Materials Brochure, 1st Edition, p. 370, Aug. 31, 2004, (3 pages). (Machine English Translation of Abstract only. See International Search Report for PCT/CN2020/088418).
Aalto-Korte et al., "Occupational contact allergy to components of polyester resin systems," Contact Dermatitis, vol. 75, No. 1, pp. 14-19, Mar. 4, 2016, (6 pages).
Tong et al. "Preparation of Unsaturated Polyesters from Neopentyl Glycol," Fiber Reinforced Plastics, No. 1, ISSN: 2096-8000, pp. 47-51, Mar. 1, 1984, (6 pages). (Machine English Translation of Abstract only. See International Search Report for PCT/CN2020/088418).
Chief Editor: Wang, Wenguang, "(iii) Triazine," Plastics Formulation and Design, First Edition, p. 315, Sep. 30, 2001, (2 pages). (See International Search Report for PCT/CN2020/088418).
Affrossman et al., "Effect of Surface Treatments of Titanium Dioxide Pigments on the Cure of Polyester/Trigylcidyl Isocyanurate Powder Coatings," Journal of Coatings Technology and Research, vol. 12, Issue 6, pp. 1053-1064, Nov. 1, 2015, (29 pages).
Jietang et al., "Preparation and properties of polyester resin-based powder coatings," Materials Protection, vol. 50, No. 2, pp. 56-73, Feb. 2017, (6 pages). (Machine English Translation of Abstract only).
Hong et al., "Curing Behavior of Polyester Resin Powder Coatings," CIESC Journal, vol. 63, No. 4, pp. 1316-1320, Apr. 2012, (7 pages). (Machine English Translation of Abstract only).
Korean Office Action, and English Counterpart therefore, for Korean Counterpart Application No. 10-2022-7018458, mailed Jun. 7, 2024, (17 pages).

* cited by examiner

UNSATURATED POLYESTER RESIN, AND PREPARATION METHOD THEREFOR AND USE THEREOF

CROSS REFERENCES TO RELATED APPLICATIONS

This disclosure is a national stage application under 35 USC § 371 (c) of PCT Application No. PCT/CN2020/088418, entitled "UNSATURATED POLYESTER RESIN, AND PREPARATION METHOD THEREFOR AND USE THEREOF", filed on Apr. 30, 2020, which claims priority from China Patent Application No. 201911250952.8, filed on Dec. 9, 2019. The content of the above application is hereby incorporated by reference in its entirety.

TECHNICAL FIELD

The present disclosure relates to the field of high molecular polymers, in particular to an unsaturated polyester resin and a preparation method therefor and use thereof.

BACKGROUND

Unsaturated polyester resin is a linear high-molecular compound containing ester bonds, and generally contains a large number of benzene rings. Its long-term exposure to ultraviolet rays will transform the aromatic structure into a dark quinone structure, resulting in yellowing and chalking of the product, affecting its appearance and lifetime.

Chinese patent application CN106751633A provides an unsaturated polyester resin with excellent aging resistance, wherein organic montmorillonite, nano titanium dioxide, and nano zinc oxide as fillers are added as well as a modified ultraviolet absorber and an antioxidant, resulting in a significantly improved anti-aging performance of unsaturated polyester resin. However, this technology uses ultraviolet absorbers and antioxidants that are poorly compatible with polymers, and has the disadvantages of easy volatilization, easy migration, and intolerance to solvent extraction. Its long-term exposure to ultraviolet light will cause a large number of free radicals to combine with the hydrogen atoms on the hydroxyl group, making it lose the effect of absorbing ultraviolet light or anti-oxidation.

Chinese patent CN105482087A provides an unsaturated polyester resin that is made by polycondensation using an aliphatic unsaturated acid for polycondensation, avoiding the problem of yellowing caused by the quinoid transformation. However, the heat distortion temperature of the resin prepared by this technology is only 110° C.

Chinese patent CN105906792A provides an unsaturated polyester resin that is made by polycondensation using an alicyclic polyol and an unsaturated acid with no aromatic structure, which has good yellowing resistance and improved heat resistance. However, the heat distortion temperature of the resin prepared by this technology is still below 130° C.

SUMMARY

Accordingly, the present disclosure provides an unsaturated polyester resin and a preparation method therefor and use thereof. The unsaturated polyester resin has good yellowing resistance, good heat resistance, and a heat distortion temperature generally higher than 130° C.

The specific technical solutions are as follows:

An unsaturated polyester resin is prepared from the following raw materials comprising by mass:

| | |
|---|---|
| prepolymer | 50-90 parts; |
| styrene | 10-30 parts; |
| methyl methacrylate | 5-15 parts; and |
| triglycidyl isocyanurate | 5-15 parts; | wherein the prepolymer is combined by polyol, benzene-containing polybasic acid, and unsaturated polybasic acid with a molar ratio of (2.2-4.5):(1-1.5):(1-1.5); and hydroxyl group and carboxyl group in the prepolymer has a molar ratio of (1.0-1.5):1.

The present disclosure also provides a method for preparing the unsaturated polyester resin.

The specific technical solutions are as follows:

A method for preparing the unsaturated polyester resin includes the following steps:

mixing the polyol, the benzene-containing polybasic acid, and the unsaturated polybasic acid at 20° C.-30° C., heating to 160° C.-230° C., reacting until an acid value is less than 50 mg KOH/g, cooling to 65-80° C., adding the styrene, the methyl methacrylate, and the triglycidyl isocyanurate, preserving heat, and reacting until the acid value is less than 10 mg KOH/g.

The present disclosure also provides a resin paste composition.

The specific technical solutions are as follows:

A resin paste composition is prepared from the following raw materials comprising by mass:

| | |
|---|---|
| the unsaturated polyester resin as described above | 20-40 parts; |
| a cycloaliphatic epoxy resin | 10-50 parts; |
| an initiator | 0.1-1 parts; |
| a curing agent | 2-20 parts; |
| an accelerator | 0.1-5 parts; and |
| a filler | 5-70 parts. |

The present disclosure also provides a prepreg.

The specific technical solutions are as follows:

A prepreg, wherein raw materials of the prepreg include the unsaturated polyester resin as described above, or the unsaturated polyester resin prepared by the preparation method as described above, or the resin paste composition as described above.

The present disclosure also provides a laminated board.

The specific technical solutions are as follows:

A laminated board, wherein raw materials of the laminated board include the unsaturated polyester resin as described above, or the unsaturated polyester resin prepared by the preparation method as described above, or the resin paste composition as described above, or the prepreg as described above.

Compared with the existing solutions, the present disclosure has the following beneficial effects:

The conventional method for synthesizing the unsaturated polyester resin is polycondensing a saturated or unsaturated polyol and a polybasic acid to form linear a high molecular polymer, and then adding vinyl monomers to produce cross-linking to form the unsaturated polyester resin. On this basis, the unsaturated polyester resin of the present disclosure has a further improvement, specifically, a prepolymer consisting of a polyol, a benzene-containing polybasic acid, and an unsaturated polybasic acid in a molar ratio of (2.2-4.5):(1-1.5):(1-1.5) and having hydroxyl groups and carboxyl groups in a molar ratio of (1.0-1.5):1 is added. In the prepolymer, an appropriate amount of unsaturated polybasic acid is added, which is utilized to introduce a certain proportion of double bonds, so as to enhance the subsequent crosslinking reaction activity, increase the heat distortion temperature, and reduce the amount of benzene-containing polybasic acid added to a certain extent, reduce the problem of yellowing. A small amount of triglycidyl isocyanurate containing triazine structure is added to the unsaturated polyester resin. In addition to its characters of excellent heat resistance and UV resistance, more importantly, triglycidyl isocyanurate can participate in the crosslinking process of unsaturated polyester resin. During curing, its epoxy groups can bond with the carboxyl groups in the polyester, and the epoxy groups can be subjected to an open-ring reaction and bond with each other, resulting in a high crosslinking density of the unsaturated polyester resin after curing. At the same time, controlling the proportion of benzene-containing polybasic acid can enhance the curing reaction activity with triglycidyl isocyanurate and facilitate adjustment of the crosslinking reaction rate of the prepolymer, so that the construction conditions have a wider range, and the finally prepared unsaturated polyester resin has good yellowing resistance, good heat resistance, and a heat distortion temperature generally higher than 130° C.

In addition, a cycloaliphatic epoxy resin, an initiator, a curing agent, and the like can be added to the unsaturated polyester resin as described above for further crosslinking and curing to obtain a resin paste composition, which can be used for the production of the laminated board. The cycloaliphatic epoxy resin has good rigidity and symmetry, does not contain aromatic structure, thus avoiding the problem of quinone conversion. After the cycloaliphatic epoxy resin interacts with triglycidyl isocyanurate on the unsaturated polyester resin, the heat resistance and yellowing resistance of the resin composition can be further improved.

DETAILED DESCRIPTION OF THE EMBODIMENTS

The present disclosure will be further described in detail below in conjunction with specific embodiments. The present disclosure can be implemented in many different forms and is not limited to the embodiments described herein. On the contrary, the purpose of providing these embodiments is to provide a more thorough and comprehensive understanding of the present disclosure.

Unless otherwise defined, all technical and scientific terms used herein have the same meanings as those generally understood by those skilled in the art of the present disclosure. The terms used in the specification of the present disclosure are only intended to describe the purposes of specific embodiments, rather than limiting the present disclosure. The term "and/or" as used herein includes any and all combinations of one or more related listed items.

An unsaturated polyester resin is prepared from the following raw materials comprising by mass:

| | |
|---|---|
| prepolymer | 50-90 parts; |
| styrene | 10-30 parts; |
| methyl methacrylate | 5-15 parts; and |
| triglycidyl isocyanurate | 5-15 parts; | wherein the prepolymer is combined by polyol, benzene-containing polybasic acid, and unsaturated polybasic acid with a molar ratio of (2.2-4.5):(1-1.5):(1-1.5); and hydroxyl group and carboxyl group in the prepolymer has a molar ratio of (1.0-1.5):1.

Preferably, the unsaturated polyester resin is prepared from the following raw materials comprising by mass:

| | |
|---|---|
| prepolymer | 50-60 parts; |
| styrene | 10-30 parts; |
| methyl methacrylate | 5-15 parts; and |
| triglycidyl isocyanurate | 5-15 parts. |

Preferably, the prepolymer is prepared from a polyol, a benzene-containing polybasic acid, and an unsaturated polybasic acid with a molar ratio of (2.2-3):(1-1.5):1.

The polyol is preferably one or more of neopentyl glycol, 1,4-cyclohexanedimethanol, trimethylpentanediol, and ethylbutylpropanediol.

The benzene-containing polybasic acid is preferably one or more of terephthalic acid, isophthalic acid and trimellitic anhydride.

The unsaturated polybasic acid is preferably one or more of maleic acid, maleic anhydride and fumaric acid.

It should be understood that, in order to prolong the storage time of the unsaturated polyester resin as described above and facilitate the construction, the composition of the unsaturated polyester resin may also include a polymerization inhibitor. The polymerization inhibitor may be one or more of p-benzoquinone, p-tert-butylcatechol, and hydroquinone. However, the addition of the polymerization inhibitor will directly or indirectly introduce a quinone structure, which will adversely affect the yellowing resistance of the unsaturated polyester resin.

The present disclosure also provides a method for preparing the unsaturated polyester resin as described above. The method specifically includes the following steps:

mixing the polyol, the benzene-containing polybasic acid, and the unsaturated polybasic acid at 20° C.-30° C., heating to 160° C.-230° C., reacting until an acid value is less than 50 mg KOH/g, cooling to 65-80° C., adding the styrene, the methyl methacrylate, and the triglycidyl isocyanurate, preserving heat, and reacting until the acid value is less than 10 mg KOH/g.

It should be understood that mixing the polyol, the benzene-containing polybasic acid and the unsaturated polybasic acid can be carried out under a nitrogen atmosphere, and the temperature is raised to 160-230° C. under the nitrogen atmosphere for reaction until the acid value is less than 50 mg KOH/g.

Furthermore, during heat preservation, the system can also be vacuumed for reaction until the acid value is less than 10 mg KOH/g.

Optionally, when the above-mentioned unsaturated polyester resin is used alone, the mixture obtained by the above-mentioned preparation method is heated to 190-210° C., reacted for 10-30 minutes, and cured, obtaining a resultant ready for use.

The present disclosure also provides a resin paste composition.

The resin paste composition is prepared from the following raw materials comprising by mass:

| | |
|---|---|
| the unsaturated polyester resin as described above | 20-40 parts; |
| a cycloaliphatic epoxy resin | 10-50 parts; |
| an initiator | 0.1-1 parts; |

-continued

| a curing agent | 2-20 parts; |
|---|---|
| an accelerator | 0.1-5 parts; and |
| a filler | 5-70 parts. |

Preferably, the cycloaliphatic epoxy resin is one or more selected from the group consisting of diglycidyl ether, diglycidyl amine, diglycidyl ester, triglycidyl ether, triglycidyl amine and triglycidyl which contain one or more substituted cyclohexane structures. Examples include CEL-2102P (Daicel, Japan), Syna Epoxy S-28 (Synasia, Nantong), ERL-4221D (Dow Chemical), etc.

It should be understood that, the cycloaliphatic epoxy resin does not contain a benzene ring.

Preferably, the initiator is one or more selected from the group consisting of acyl peroxides, hydroperoxides, dialkyl peroxides, ester peroxides, ketone peroxides and dicarbonate peroxides.

Preferably, the curing agent is one or more selected from the group consisting of cyanate ester curing agents, aliphatic polyamine curing agents, aromatic amine curing agents, polyamide curing agents, lewis acid-amine complex curing agents, acid anhydride curing agents, and benzoxazine curing agents.

Preferably, the accelerator is one or more selected from the group consisting of 2-methylimidazole, 2-ethyl-4-methylimidazole, 2-phenylimidazole, 2-phenyl-4-methylimidazole, 1-methylimidazole, 1-fluoroethyl-2-ethyl-4-methylimidazole and 2-undecylimidazole.

Preferably, the filler consists of titanium dioxide, cerium dioxide, barium sulfate and nano silicon powder.

It should be understood that an inorganic filler has a particle size ranging from 10 nm to 1000 nm.

The present disclosure also provides a prepreg, raw materials of the prepreg includes the unsaturated polyester resin as described above, or the unsaturated polyester resin prepared by the preparation method as described above, or the resin paste composition as described above.

It should be understood that, the method for preparing the prepreg includes the following steps:

covering the unsaturated polyester resin as described above, or the unsaturated polyester resin prepared by the preparation method as described above, or the resin paste composition as described above on a surface of a reinforcing material by impregnation or coating method, and curing to obtain a prepreg.

Preferably, the process parameters of the curing are: heating to a temperature of 150-200° C. and keeping the consistent temperature for 2-5 min.

It should be understood that the reinforcing material is one or more selected from the group consisting of paper, glass cloth, non-woven glass fabric, aramid paper, aramid cloth, glass felt, and glass roving.

The present disclosure also provides a laminated board, raw materials of the laminated board including the unsaturated polyester resin as described above, or the unsaturated polyester resin prepared by the preparation method as described above, or the resin paste composition as described above, or the prepreg as described above.

It should be understood that, the method for preparing the laminated board includes the following steps:

laminating a plurality of the prepregs.

Preferably, the process parameters of the lamination are: hot pressing for 100 min-150 min under conditions of a temperature of 180-200° C., a pressure of 10 kgf/cm2-30 kgf/cm2, and a vacuum degree less than 2 kPa.

The "plurality of the prepregs" refers to at least one prepreg.

It should be noted that, during the lamination, the plurality of the prepregs, that is, the laminated body can be covered with a metal copper foil on one or both sides, and then laminated to obtain a laminated board covered with the metal copper foil.

Preferably, the metal foil has a thickness of 18 μm.

The following further description is provided in combination with specific examples. In the following specific examples, all raw materials can be sourced from the market unless otherwise stated. All raw materials are calculated in parts by mass unless otherwise stated.

Example 1

(1) Unsaturated Polyester Resin and its Preparation Method 26.4 parts of 1,4-cyclohexanedimethanol, 16.9 parts of isophthalic acid, 6.7 parts of maleic acid, 10 parts of styrene, 5 parts of methyl methacrylate, and 5 parts of triglycidyl isocyanurate were weighed. A molar ratio of the 1,4-cyclohexanedimethanol, isophthalic acid, and maleic acid was n(1,4-cyclohexanedimethanol):n(isophthalic acid):n(maleic acid)=2.7:1.5:1, a molar ratio of hydroxyl to carboxyl was 1.08:1.

1,4-cyclohexanedimethanol, isophthalic acid and maleic acid were added under a nitrogen atmosphere at a temperature of 25° C., and continued to be heated to 200° C. under a nitrogen atmosphere for reaction until an acid value was less than 50 mg KOH/g. After cooling to 70° C., styrene, methyl methacrylate and triglycidyl isocyanurate were added followed by preserving heat and vacuumizing. The reaction was carried out until the acid value is less than 10 mg KOH/g, and then cooled to room temperature, obtaining an unsaturated polyester resin A.

(2) Resin Paste Composition and its Preparation Method 40 parts of the resin A, 50 parts of cycloaliphatic epoxy resin (ERL-4221D, Dow Chemical), 0.1 part of initiator (methyl ethyl ketone peroxide), 10 parts of curing agent (styrene-maleic anhydride block copolymer), 0.5 part of accelerator (2-methylimidazole) and 40 parts of inorganic filler were weighed, mixed well under stirring, thus obtaining a resin paste composition A.

(3) Laminated Board and its Preparation Method 2116 glass fiber cloth was immersed in the above resin paste composition A, heated to a constant temperature of 180° C. and kept for 3 min, thus obtaining a prepreg.

8 sheets of the above prepregs were laminated and heated and hot-pressed for 120 minutes under conditions of a temperature of 190° C., a pressure of 20 kgf/cm2, and a vacuum degree of less than 2 kPa, thus obtaining a laminated board.

Example 2

(1) Unsaturated Polyester Resin and its Preparation Method 27.7 parts of 1,4-cyclohexanedimethanol, 11.8 parts of isophthalic acid, 10.5 parts of maleic acid, 10 parts of styrene, 5 parts of methyl methacrylate, and 5 parts of triglycidyl isocyanurate were weighed. A molar ratio of the 1,4-cyclohexanedimethanol, isophthalic acid, and maleic acid was n(1,4-cyclohexanedimethanol):n(isophthalic acid):n(maleic acid)=2.7:1:1.5, a molar ratio of hydroxyl to carboxyl was 1.08:1.

With the same preparation method of the unsaturated polyester as that in Example 1, an unsaturated polyester resin B was prepared in this example.

(2) Resin Paste Composition and its Preparation Method 40 parts of the resin B, 50 parts of cycloaliphatic epoxy resin (ERL-4221D, Dow Chemical), 0.1 part of initiator (methyl ethyl ketone peroxide), 10 parts of curing agent (styrene-maleic anhydride block copolymer), 0.5 part of accelerator (2-methylimidazole) and 40 parts of inorganic filler were weighed, mixed well under stirring, thus obtaining a resin paste composition B.

(3) Laminated Board and its Preparation Method

With the same preparation method of the laminated board as that in Example 1 except that 2116 glass fiber cloth was immersed in the above resin paste composition B, a laminated board B was prepared.

Example 3

(1) Unsaturated Polyester Resin and its Preparation Method 31.0 parts of 1,4-cyclohexanedimethanol, 11.9 parts of isophthalic acid, 7.0 parts of maleic acid, 10 parts of styrene, 5 parts of methyl methacrylate, and 5 parts of triglycidyl isocyanurate were weighed. A molar ratio of the 1,4-cyclohexanedimethanol, isophthalic acid, and maleic acid was n(1,4-cyclohexanedimethanol):n(isophthalic acid):n(maleic acid)=4.5:1.5:1.5, a molar ratio of hydroxyl to carboxyl was 1.5:1.

With the same preparation method of the unsaturated polyester as that in Example 1, an unsaturated polyester resin C was prepared in this example.

(2) Resin Paste Composition and its Preparation Method 40 parts of the resin C, 50 parts of cycloaliphatic epoxy resin (ERL-4221D, Dow Chemical), 0.1 part of initiator (methyl ethyl ketone peroxide), 10 parts of curing agent (styrene-maleic anhydride block copolymer), 0.5 part of accelerator (2-methylimidazole) and 40 parts of inorganic filler were weighed, mixed well under stirring, thus obtaining a resin paste composition C.

(3) Laminated Board and its Preparation Method

With the same preparation method of the laminated board as that in Example 1 except that 2116 glass fiber cloth was immersed in the above resin paste composition C, a laminated board C was prepared.

Example 4

(1) Unsaturated Polyester Resin and its Preparation Method 27.3 parts of 1,4-cyclohexanedimethanol, 14.3 parts of isophthalic acid, 8.4 parts of maleic acid, 10 parts of styrene, 5 parts of methyl methacrylate, and 5 parts of triglycidyl isocyanurate were weighed. A molar ratio of the 1,4-cyclohexanedimethanol, isophthalic acid, and maleic acid was n(1,4-cyclohexanedimethanol):n(isophthalic acid):n(maleic acid)=2.2:1:1, a molar ratio of hydroxyl to carboxyl was 1.1:1.

With the same preparation method of the unsaturated polyester as that in Example 1, an unsaturated polyester resin D was prepared in this example.

(2) Resin Paste Composition and its Preparation Method 40 parts of the resin D, 50 parts of cycloaliphatic epoxy resin (ERL-422 ID, Dow Chemical), 0.1 part of initiator (methyl ethyl ketone peroxide), 10 parts of curing agent (styrene-maleic anhydride block copolymer), 0.5 part of accelerator (2-methylimidazole) and 40 parts of inorganic filler were weighed, mixed well under stirring, thus obtaining a resin paste composition D.

(3) Laminated Board and its Preparation Method

With the same preparation method of the laminated board as that in Example 1 except that 2116 glass fiber cloth was immersed in the above resin paste composition D, a laminated board D was prepared.

Example 5

(1) Unsaturated Polyester Resin and its Preparation Method 27.3 parts of 1,4-cyclohexanedimethanol, 14.3 parts of isophthalic acid, 8.4 parts of maleic acid, 30 parts of styrene, 10 parts of methyl methacrylate, and 10 parts of triglycidyl isocyanurate were weighed. A molar ratio of the 1,4-cyclohexanedimethanol, isophthalic acid, and maleic acid was n(1,4-cyclohexanedimethanol):n(isophthalic acid):n(maleic acid)=2.2:1:1.

With the same preparation method of the unsaturated polyester as that in Example 1, an unsaturated polyester resin E was prepared in this example.

(2) Resin Paste Composition and its Preparation Method 30 parts of the resin E, 10 parts of cycloaliphatic epoxy resin (ERL-4221D, Dow Chemical), 0.5 part of initiator (methyl ethyl ketone peroxide), 2 parts of curing agent (styrene-maleic anhydride block copolymer), 0.1 part of accelerator (2-methylimidazole) and 5 parts of inorganic filler were weighed, mixed well under stirring, thus obtaining a resin paste composition E.

(3) Laminated Board and its Preparation Method

With the same preparation method of the laminated board as that in Example 1 except that 2116 glass fiber cloth was immersed in the above resin paste composition E, a laminated board E was prepared.

Example 6

(1) Unsaturated Polyester Resin and its Preparation Method 27.3 parts of 1,4-cyclohexanedimethanol, 14.3 parts of isophthalic acid, 8.4 parts of maleic acid, 10 parts of styrene, 15 parts of methyl methacrylate, and 5 parts of triglycidyl isocyanurate were weighed. A molar ratio of the 1,4-cyclohexanedimethanol, isophthalic acid, and maleic acid was n(1,4-cyclohexanedimethanol):n(isophthalic acid):n(maleic acid)=2.2:1:1.

With the same preparation method of the unsaturated polyester as that in Example 1, an unsaturated polyester resin F was prepared in this example.

(2) Resin Paste Composition and its Preparation Method 10 parts of the resin F, 50 parts of cycloaliphatic epoxy resin (ERL-4221D, Dow Chemical), 1 part of initiator (methyl ethyl ketone peroxide), 20 parts of curing agent (styrene-maleic anhydride block copolymer), 0.5 part of accelerator (2-methylimidazole) and 70 parts of inorganic filler were weighed, mixed well under stirring, thus obtaining a resin paste composition F.

(3) Laminated Board and its Preparation Method

With the same preparation method of the laminated board as that in Example 1 except that 2116 glass fiber cloth was immersed in the above resin paste composition F, a laminated board F was prepared.

Example 7

27.3 parts of 1,4-cyclohexanedimethanol, 14.3 parts of isophthalic acid, 8.4 parts of maleic acid, 10 parts of styrene, 5 parts of methyl methacrylate, and 15 parts of triglycidyl isocyanurate were weighed. A molar ratio of the 1,4-cyclohexanedimethanol, isophthalic acid, and maleic acid was n(1,4-cyclohexanedimethanol):n(isophthalic acid):n(maleic acid)=2.2:1:1.

With the same preparation method of the unsaturated polyester as that in Example 1, an unsaturated polyester resin G was prepared in this example.

(2) Resin Paste Composition and its Preparation Method 40 parts of the resin G, 50 parts of cycloaliphatic epoxy resin (ERL-4221D, Dow Chemical), 0.1 part of initiator (methyl ethyl ketone peroxide), 10 parts of curing agent (styrene-maleic anhydride block copolymer), 0.5 part of accelerator (2-methylimidazole) and 40 parts of inorganic filler were weighed, mixed well under stirring, thus obtaining a resin paste composition G.

(3) Laminated Board and its Preparation Method

With the same preparation method of the laminated board as that in Example 1 except that 2116 glass fiber cloth was immersed in the above resin paste composition G, a laminated board G was prepared.

Comparative Example 1

(1) Commercially Available 199 #Unsaturated Polyester Resin was Used as an Unsaturated Polyester Resin H.

(2) Resin Paste Composition and its Preparation Method 40 parts of the resin H, 50 parts of cycloaliphatic epoxy resin (ERL-4221D, Dow Chemical), 0.1 part of initiator (methyl ethyl ketone peroxide), 10 parts of curing agent (styrene-maleic anhydride block copolymer), 0.5 part of accelerator (2-methylimidazole) and 40 parts of inorganic filler were weighed, mixed well under stirring, thus obtaining a resin paste composition H.

(3) Laminated Board and its Preparation Method

With the same preparation method of the laminated board as that in Example 1 except that 2116 glass fiber cloth was immersed in the above resin paste composition H, a laminated board H was prepared.

Comparative Example 2

(1) Unsaturated Polyester Resin and its Preparation Method 26.4 parts of 1,4-cyclohexanedimethanol, 16.9 parts of isophthalic acid, 6.7 parts of maleic acid, 10 parts of styrene, and 5 parts of methyl methacrylate were weighed. A molar ratio of the 1,4-cyclohexanedimethanol, isophthalic acid, and maleic acid was n(1,4-cyclohexanedimethanol):n(isophthalic acid):n(maleic acid)=2.7:1.5:1, a molar ratio of hydroxyl to carboxyl was 1.08:1.

With the same preparation method of the unsaturated polyester as that in Example 1 except that triglycidyl isocyanurate was not added, an unsaturated polyester resin I was prepared in this comparative example.

(2) Resin Paste Composition and its Preparation Method 40 parts of the resin I, 50 parts of cycloaliphatic epoxy resin (ERL-4221D, Dow Chemical), 0.1 part of initiator (methyl ethyl ketone peroxide), 10 parts of curing agent (styrene-maleic anhydride block copolymer), 0.5 part of accelerator (2-methylimidazole) and 40 parts of inorganic filler were weighed, mixed well under stirring, thus obtaining a resin paste composition I.

(3) Laminated Board and its Preparation Method

With the same preparation method of the laminated board as that in Example 1 except that 2116 glass fiber cloth was immersed in the above resin paste composition I, a laminated board I was prepared.

Comparative Example 3

(1) Unsaturated Polyester Resin and its Preparation Method 29.1 parts of 1,4-cyclohexanedimethanol, 6.2 parts of isophthalic acid, 14.7 parts of maleic acid, 10 parts of styrene, 5 parts of methyl methacrylate, and 5 parts of triglycidyl isocyanurate were weighed. A molar ratio of the 1,4-cyclohexanedimethanol, isophthalic acid, and maleic acid was n(1,4-cyclohexanedimethanol):n(isophthalic acid):n(maleic acid)=2.7:0.5:2, a molar ratio of hydroxyl to carboxyl was 1.08:1.

With the same preparation method of the unsaturated polyester as that in Example 1, an unsaturated polyester resin J was prepared in this comparative example.

(2) Resin Paste Composition and its Preparation Method 40 parts of the resin J, 50 parts of cycloaliphatic epoxy resin (ERL-4221D, Dow Chemical), 0.1 part of initiator (methyl ethyl ketone peroxide), 10 parts of curing agent (styrene-maleic anhydride block copolymer), 0.5 part of accelerator (2-methylimidazole) and 40 parts of inorganic filler were weighed, mixed well under stirring, thus obtaining a resin paste composition J.

(3) Laminated Board and its Preparation Method

With the same preparation method of the laminated board as that in Example 1 except that 2116 glass fiber cloth was immersed in the above resin paste composition J, a laminated board J was prepared.

Formulas of the unsaturated polyester resins of Examples and Comparative Examples were summarized in Table 1.

TABLE 1

| Composition | Resin A | Resin B | Resin C | Resin D | Resin E | Resin F | Resin G | Resin I | Resin J |
| --- | --- | --- | --- | --- | --- | --- | --- | --- | --- |
| n(polyol):n(benzene-containing polybasic acid):n(unsaturated polybasic acid) | 2.7:1.5:1 | 2.7:1:1.5 | 4.5:1.5:1.5 | 2.2:1:1 | 2.2:1:1 | 2.2:1:1 | 2.2:1:1 | 2.7:1.5:1 | 2.7:0.5:2 |
| 1,4-cyclohexane-dimethanol | 26.4 | 27.7 | 31.0 | 27.3 | 27.3 | 27.3 | 27.3 | 26.4 | 29.1 |
| isophthalic acid | 16.9 | 11.8 | 11.9 | 14.3 | 14.3 | 14.3 | 14.3 | 16.9 | 6.2 |
| maleic acid | 6.7 | 10.5 | 7.0 | 8.4 | 8.4 | 8.4 | 8.4 | 6.7 | 14.7 |
| styrene | 10 | 10 | 10 | 10 | 30 | 10 | 10 | 10 | 10 |
| methyl methacrylate | 5 | 5 | 5 | 5 | 10 | 15 | 5 | 5 | 5 |
| triglycidyl isocyanurate | 5 | 5 | 5 | 5 | 10 | 5 | 15 | 0 | 5 |

Formulas of the resin paste compositions of Examples and Comparative Examples were summarized in Table 2.

TABLE 2

| Composition | Composition A | Composition B | Composition C | Composition D | Composition E | Composition F | Composition G | Composition H | Composition I | Composition J |
|---|---|---|---|---|---|---|---|---|---|---|
| Resin A | 40 | | | | | | | | | |
| Resin B | | 40 | | | | | | | | |
| Resin C | | | 40 | | | | | | | |
| Resin D | | | | 40 | | | | | | |
| Resin E | | | | | 30 | | | | | |
| Resin F | | | | | | 10 | | | | |
| Resin G | | | | | | | 40 | | | |
| Resin H | | | | | | | | 40 | | |
| Resin I | | | | | | | | | 40 | |
| Resin J | | | | | | | | | | 40 |
| a cycloaliphatic epoxy resin | 50 | 50 | 50 | 50 | 10 | 50 | 50 | 50 | 50 | 50 |
| methyl ethyl ketone peroxide | 0.1 | 0.1 | 0.1 | 0.1 | 0.5 | 1 | 0.1 | 0.1 | 0.1 | 0.1 |
| styrene-maleic anhydride block copolymer | 10 | 10 | 10 | 10 | 2 | 20 | 10 | 10 | 10 | 10 |
| 2-methylimidazole | 0.5 | 0.5 | 0.5 | 0.5 | 0.1 | 0.5 | 0.5 | 0.5 | 0.5 | 0.5 |
| inorganic filler | 40 | 40 | 40 | 40 | 5 | 70 | 40 | 40 | 40 | 40 |

Evaluation Method (1) Yellowing resistance: the unsaturated polyester resin A-3 was weighed and heated to 200° C. for reaction for 10 minutes, respectively. Under the CIE 1976L*a*b* color model, L* value, a* value, and b* value were measured using an average daylight source (C light source, 6774 k color temperature) for irradiation. Then, an ultraviolet aging test was performed according to the method as described in "GB/T 23987-2009". The test was performed for 168 hr and 336 hr under condensation conditions using a QUV/Spray ultraviolet aging test box and a UVA-340 lamp tube. After 168 hr and 336 hr of the test, the L* value, a* value, and b* value were measured again. According to the formula: $\Delta E=(\Delta L2+\Delta a2+\Delta b2)^{1/2}$, the total color difference $\Delta E$ was calculated. A smaller $\Delta E$ value indicates better yellowing resistance. The results are shown in Table 3.

The laminated boards A-J were weighed. Under the CIE 1976L*a*b* color model, L* value, a* value, and b* value were measured using an average daylight source (C light source, 6774 k color temperature) for irradiation. Then, an ultraviolet aging test was performed according to the method as described in "GB/T 23987-2009". The test was performed for 168 hr and 336 hr under condensation conditions using a QUV/Spray ultraviolet aging test box and a UVA-340 lamp tube. After 168 hr and 336 hr of the test, the L* value, a* value, and b* value were measured again. According to the formula: $\Delta E=(\Delta L2+\Delta a2+\Delta b2)^{1/2}$, the total color difference $\Delta E$ was calculated. A smaller $\Delta E$ value indicates better yellowing resistance. The results are shown in Table 4.

(2) Heat Resistance

The unsaturated polyester resins A-J were weighed and heated to 200° C. for reaction for 10 minutes, respectively. A heat distortion temperature test was performed according to the method as described "GB/T1634-2004". A higher heat distortion temperature indicates better heat resistance. The results are shown in Table 3.

The laminated boards A-J were weighed. A glass transition temperature test was performed according to the method as described in "IPC-TM-650 2.4.24". The results are shown in Table 4.

TABLE 3

| Evaluation method | | Resin A | Resin B | Resin C | Resin D | Resin E | Resin F | Resin G | Resin H | Resin I | Resin J |
|---|---|---|---|---|---|---|---|---|---|---|---|
| Total color difference ΔE | 168-hr test | 2.7 | 3.4 | 2.4 | 2.5 | 2.9 | 2.2 | 1.7 | 10.8 | 12.4 | 4.2 |
| | 336-hr test | 3.6 | 5.2 | 3.5 | 3.7 | 4.0 | 3.1 | 2.6 | 11.7 | 17.2 | 6.3 |
| heat distortion temperature/° C. | | 132 | 136 | 135 | 136 | 139 | 135 | 134 | 125 | 116 | 128 |

TABLE 4

| Evaluation method | | Laminated board A | Laminated board B | Laminated board C | Laminated board D | Laminated board E | Laminated board F | Laminated board G | Laminated board H | Laminated board I | Laminated board J |
|---|---|---|---|---|---|---|---|---|---|---|---|
| Total color difference ΔE | 168-hr test | 1.4 | 1.9 | 1.5 | 1.5 | 1.6 | 1.1 | 0.8 | 8.2 | 9.7 | 2.8 |
| | 336-hr test | 1.8 | 2.6 | 1.7 | 1.8 | 2.0 | 1.7 | 1.4 | 10.1 | 13.5 | 5.2 |
| Glass transition temperature/° C. | | 163 | 158 | 151 | 145 | 146 | 156 | 160 | 132 | 124 | 137 |

It can be seen from Table 3 and Table 4 that the unsaturated polyester resins and the laminated boards prepared in Examples 1-7 had generally small total color difference value ΔE, and the unsaturated polyester resins prepared in Examples 1-7 had glass transition temperatures all greater than 130° C., and even the glass transition temperatures of the laminated boards prepared in Examples 1-7 were all greater than 145° C. It showed that the unsaturated polyester resins and laminated boards prepared in Examples 1-7 had good yellowing resistance and heat resistance. The molar ratio of the polyol, benzene-containing polybasic acid and unsaturated polybasic acid and the amount of triglycidyl isocyanurate added had varying degrees of influence on the yellowing resistance and heat resistance of unsaturated polyester resins and laminated boards.

The performance of the unsaturated polyester resins and laminated boards prepared in Comparative Examples 1-3 was obviously not as good as that of Example 1. In Comparative Example 1, the commercially available 199 #unsaturated polyester resin had the highest total color difference value ΔE, and poor yellowing resistance, and the laminated board prepared therefrom also had poor yellowing resistance. The unsaturated polyester resin obtained in Comparative Example 2, in which triglycidyl isocyanurate was not added, had a larger ΔE than that of Example 1, and lower glass transition temperature, indicating that the addition of triglycidyl isocyanurate is of great significance to improve the yellowing resistance and heat resistance of unsaturated polyester resins. The unsaturated polyester resin obtained from the prepolymer of Comparative Example 3 with n(1, 4-cyclohexanedimethanol):n(isophthalic acid):n(maleic acid) equal to 2.7:0.5:2, had a smaller ΔE, but a lower glass transition temperature, thus cannot meet the requirements for comprehensive performance.

The technical features of the embodiments described above may be arbitrarily combined. For the sake of brevity of description, not all possible combinations of the technical features in the aforementioned embodiments are described. However, as long as there is no contradiction between the combinations of these technical features, all should be considered as the scope of this specification.

The above embodiments only represent several examples of the present disclosure, and the description thereof is more specific and detailed. but it should not be construed as restricting the scope of the present disclosure. It should be understood that, the applications of the present disclosure are not limited to the above-described examples, and those skilled in the art can make modifications and changes in accordance with the above description, all of which are within the protection scope of the present disclosure. Therefore, the protection scope of the present disclosure shall be defined by the appended claims.

What is claimed is:

1. An unsaturated polyester resin composition, prepared from the following raw materials comprising by mass:
    prepolymer 50-90 parts;
    styrene 10-30 parts;
    methyl methacrylate 5-15 parts;
    and triglycidyl isocyanurate 5-15 parts;
    wherein the prepolymer is by derived from polyol, benzene-containing polybasic acid, and unsaturated polybasic acid with a molar ratio of (2.2-4.5):(1-1.5):(1-1.5); and hydroxyl group and carboxyl group in the prepolymer has a molar ratio of (1.0-1.5): 1.

2. The unsaturated polyester resin composition according to claim 1, wherein the unsaturated polyester resin composition is prepared from the following raw materials comprising by mass:

| | |
|---|---|
| prepolymer | 50-60 parts; |
| styrene | 10-30 parts; |
| methyl methacrylate | 5-15 parts; and |
| triglycidyl isocyanurate | 5-15 parts. |

3. The unsaturated polyester resin composition according to claim 2, wherein the prepolymer is prepared from polyol, benzene-containing polybasic acid, and unsaturated polybasic acid with a molar ratio of (2.2-3):(1-1.5): 1.

4. The unsaturated polyester resin composition according to claim 1, wherein the polyol is one or more selected from the group consisting of neopentyl glycol, 1,4-cyclohexanedimethanol, trimethylpentanediol, and ethylbutylpropanediol.

5. The unsaturated polyester resin composition according to claim 1, wherein the benzene-containing polybasic acid is one or more selected from the group consisting of terephthalic acid, isophthalic acid, and trimellitic anhydride.

6. The unsaturated polyester resin composition according to claim 1, wherein the unsaturated polybasic acid is one or more selected from the group consisting of maleic acid, maleic anhydride, and fumaric acid.

7. The unsaturated polyester resin composition according to claim 1, wherein the raw materials of the unsaturated polyester resin composition further comprise polymerization inhibitor, the polymerization inhibitor being one or more selected from the group consisting of p-benzoquinone, p-tert-butylcatechol, and hydroquinone.

8. A method for preparing the unsaturated polyester resin composition according to claim 1, comprising the following steps:
    mixing the polyol, the benzene-containing polybasic acid, and the unsaturated polybasic acid at 20° C.-30° C., heating to 160° C.-230° C., reacting until an acid value is less than 50 mg KOH/g, cooling to 65-80° C., adding the styrene, the methyl methacrylate, and the triglycidyl isocyanurate, preserving heat, and reacting until the acid value is less than 10 mg KOH/g.

9. A resin paste composition, prepared from the following raw materials comprising by mass:

| | |
|---|---|
| the unsaturated polyester resin according to claim 1 | 20-40 parts; |
| a cycloaliphatic epoxy resin | 10-50 parts; |
| an initiator | 0.1-1 parts; |
| a curing agent | 2-20 parts; |
| an accelerator | 0.1-5 parts; and |
| a filler | 5-70 parts. |

10. The resin paste composition according to claim 9, wherein the cycloaliphatic epoxy resin is one or more selected from the group consisting of diglycidyl ether, diglycidyl amine, diglycidyl ester, triglycidyl ether, triglycidyl amine, and triglycidyl which contain one or more substituted cyclohexane structures.

11. The resin paste composition according to claim 9, wherein the initiator is one or more selected from the group consisting of acyl peroxides, hydroperoxides, dialkyl peroxides, ester peroxides, ketone peroxides, and dicarbonate peroxides.

12. The resin paste composition according to claim 9, wherein the curing agent is one or more selected from the group consisting of cyanate ester curing agents, aliphatic polyamine curing agents, aromatic amine curing agents, polyamide curing agents, lewis acid-amine complex curing agents, acid anhydride curing agents, and benzoxazine curing agents.

13. The resin paste composition according to claim 9, wherein the accelerator is one or more selected from the group consisting of 2-methylimidazole, 2-ethyl-4-methylimidazole, 2-phenylimidazole, 2-phenyl-4-methylimidazole, 1-methylimidazole, 1-fluoroethyl-2-ethyl-4-methylimidazole, and 2-undecylimidazole.

14. The resin paste composition according to any claim 9, wherein the filler consists of titanium dioxide, cerium dioxide, barium sulfate, and nano silicon powder.

15. A prepreg, wherein raw materials of the prepreg comprise the unsaturated polyester resin composition according to claim 1.

16. A laminated board, wherein raw materials of the laminated board comprise the unsaturated polyester resin composition according to claim 1.

* * * * *